(12) United States Patent
Lakshtanov

(10) Patent No.: US 10,745,988 B2
(45) Date of Patent: Aug. 18, 2020

(54) METHOD FOR EXTRACTING A CORE FROM A PERCUSSION SIDE WALL CORE BULLET FOR A DIGITAL TOMOGRAPHIC DESCRIPTION AND DIRECT NUMERICAL SIMULATIONS

(71) Applicant: BP Exploration Operating Company Limited, Middlesex (GB)

(72) Inventor: Dmitry Lakshtanov, Thames Ditton (GB)

(73) Assignee: BP EXPLORATION OPERATING COMPANY LIMITED, Sunbury on Thames (GB)

( * ) Notice: Subject to any disclaimer, the term of this patent is extended or adjusted under 35 U.S.C. 154(b) by 0 days.

(21) Appl. No.: 16/386,228

(22) Filed: Apr. 16, 2019

(65) Prior Publication Data

US 2019/0339171 A1    Nov. 7, 2019

(30) Foreign Application Priority Data

May 2, 2018   (GB) .................................... 1807260.3

(51) Int. Cl.
*E21B 25/00*  (2006.01)
*G01N 23/046* (2018.01)
*E21B 49/04*  (2006.01)

(52) U.S. Cl.
CPC ............ *E21B 25/005* (2013.01); *E21B 49/04* (2013.01); *G01N 23/046* (2013.01); *G01N 2223/616* (2013.01)

(58) Field of Classification Search
CPC ......... E21B 49/04; E21B 25/005; G01N 1/08; G01N 2223/616; G01N 23/046
See application file for complete search history.

(56) References Cited

U.S. PATENT DOCUMENTS

| 2,227,198 A | 12/1940 | Piggot |
| 2,901,220 A | 8/1959 | Linn |
| 3,072,202 A * | 1/1963 | Brieger .................. E21B 49/04 175/4 |

(Continued)

FOREIGN PATENT DOCUMENTS

| CN | 203680559 U | 7/2014 |
| CN | 105563668 A | 5/2016 |
| WO | 2016146989 A1 | 9/2016 |

OTHER PUBLICATIONS

International Search Report and Written Opinion dated Aug. 23, 2019, for PCT/EP2019/061170, filed on May 1, 2019.

*Primary Examiner* — Chih-Cheng Kao
(74) *Attorney, Agent, or Firm* — John L. Wood

(57) ABSTRACT

Embodiments relate generally to methods for extracting a core from a percussion side wall core bullet for a digital tomographic description and direct numerical simulations. A method for extracting a core from a percussion side wall core bullet for a digital tomographic description and direct numerical simulations includes pushing a free end of a wire of a wire saw through the core. The core is positioned within the percussion side wall core bullet. In addition, the method includes attaching the free end to a locking mechanism of the wire saw. Further, the method includes cutting the core from the percussion side wall core bullet. The method also includes removing the core from the percussion side wall core bullet.

20 Claims, 10 Drawing Sheets

(56) References Cited

U.S. PATENT DOCUMENTS

| | | | | |
|---|---|---|---|---|
| 4,750,570 A | * | 6/1988 | Barrett | E21B 49/04 |
| | | | | 175/4 |
| 8,259,901 B1 | * | 9/2012 | Kamireddi | G01N 23/207 |
| | | | | 378/73 |
| 8,538,697 B2 | | 9/2013 | Russell et al. | |
| 9,766,164 B2 | | 9/2017 | Lakshtanov et al. | |
| 2014/0033836 A1 | | 2/2014 | Rutherford et al. | |
| 2015/0185122 A1 | | 7/2015 | Lakshtanov et al. | |
| 2016/0033371 A1 | | 2/2016 | Lakshtanov et al. | |

* cited by examiner

188

190 — Cleaning a percussion side wall core bullet ("PSWC bullet" or "bullet") of mud to minimize contamination of the PSCW ("core") during an extraction/recovery of the core from the bullet.

192 — Positioning the bullet comprising the core into an automated wire saw assembly.

194 — Cutting, with a wire of the wire saw assembly, an entry slit into the bullet, along a longitudinal axis, from a first end of the bullet through a second end of the bullet, and from an outer surface of the bullet through an inner surface of the bullet.

196 — Continuously or in steps, cutting along the inner surface of the bullet to provide a cut that extends 360° along the inner surface of the bullet with the wire, wherein a cutting force vector is tangential, pointing into the inner surface of the bullet to minimize cutting into the core and to maximize the extracted volume of the core.

198 — Removing the core from the bullet.

200 — Transferring the core from the bullet to a clean surface.

202 — Visually examining the core for deformation and mud contamination.

204 — Separating mud from the core.

FIG. 10

METHOD FOR EXTRACTING A CORE FROM A PERCUSSION SIDE WALL CORE BULLET FOR A DIGITAL TOMOGRAPHIC DESCRIPTION AND DIRECT NUMERICAL SIMULATIONS

CROSS-REFERENCE TO RELATED APPLICATIONS

This application claims benefit of UK patent application Serial No. 1807260.3 filed May 2, 2018, and entitled "Method for Extracting a Core from a Percussion Side Wall Core Bullet for a Digital Tomographic Description and Direct Numerical Simulations," which is hereby incorporated herein by reference in its entirety.

STATEMENT REGARDING FEDERALLY SPONSORED RESEARCH OR DEVELOPMENT

Not applicable.

BACKGROUND

The disclosure relates generally to systems and methods for obtaining subterranean core samples for analysis. More particularly, the disclosure relates to methods for extracting subterranean core samples from side wall core bullets for subsequent analyses.

Physical and petrophysical properties of subterranean rock formations are useful for assessing hydrocarbon reservoirs and development strategies for those reservoirs. Samples or cores of the subterranean rock formations may be recovered with coring tools. For example, a percussion sidewall core ("PSWC") may be obtained by discharging a hollow projectile or bullet into the sidewall of a borehole drilled in a subterranean formation. The sample of the formation material captured in the hollow bullet barrel is subsequently recovered at the surface for analysis. In particular, the sample is removed from the bullet barrel at the surface, and then subjected to physical laboratory tests to determine its physical and petrophysical properties.

BRIEF SUMMARY OF THE DISCLOSURE

Embodiments of methods for extracting core samples from a percussion side wall core bullet are disclosed herein. In an embodiment, a method for extracting a core from a percussion side wall core bullet for a digital tomographic description and direct numerical simulations comprises pushing a free end of a wire of a wire saw through the core. The core is positioned within the percussion side wall core bullet. Further, the method comprises attaching the free end to a locking mechanism of the wire saw. The method also comprises cutting the core from the percussion side wall core bullet. Moreover, the method comprises and removing the core from the percussion side wall core bullet.

In another embodiment, a method for extracting a core from a percussion side wall core bullet for a digital tomographic description and direct numerical simulations comprises drilling a hole through the core disposed within the percussion side wall core bullet. Further, the method comprises pushing a free end of a wire of a wire saw through the core via the hole. Still further, the method comprises attaching the free end to a locking mechanism of the wire saw. The method also comprises cutting the core from the percussion side wall core bullet. Moreover, the method comprises removing the core from the percussion side wall core bullet.

In yet another embodiment, a method for extracting a core from a percussion side wall core bullet for a digital tomographic description and direct numerical simulations comprises positioning the percussion side wall core bullet with the core disposed therein, into an automated wire saw assembly. Further, the method comprises cutting an entry slit, with a wire of the automated wire saw assembly. Still further, the method comprises cutting the core from the percussion side wall core bullet with the wire of the automated wire saw assembly. The method also comprises removing the core from the percussion side wall core bullet.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 10 is an exemplary flow chart illustrating an embodiment of a method for obtaining a core from a percussion side wall core bullet in accordance with embodiments of the disclosure.

DETAILED DESCRIPTION OF THE PREFERRED EMBODIMENTS

Figure 1:
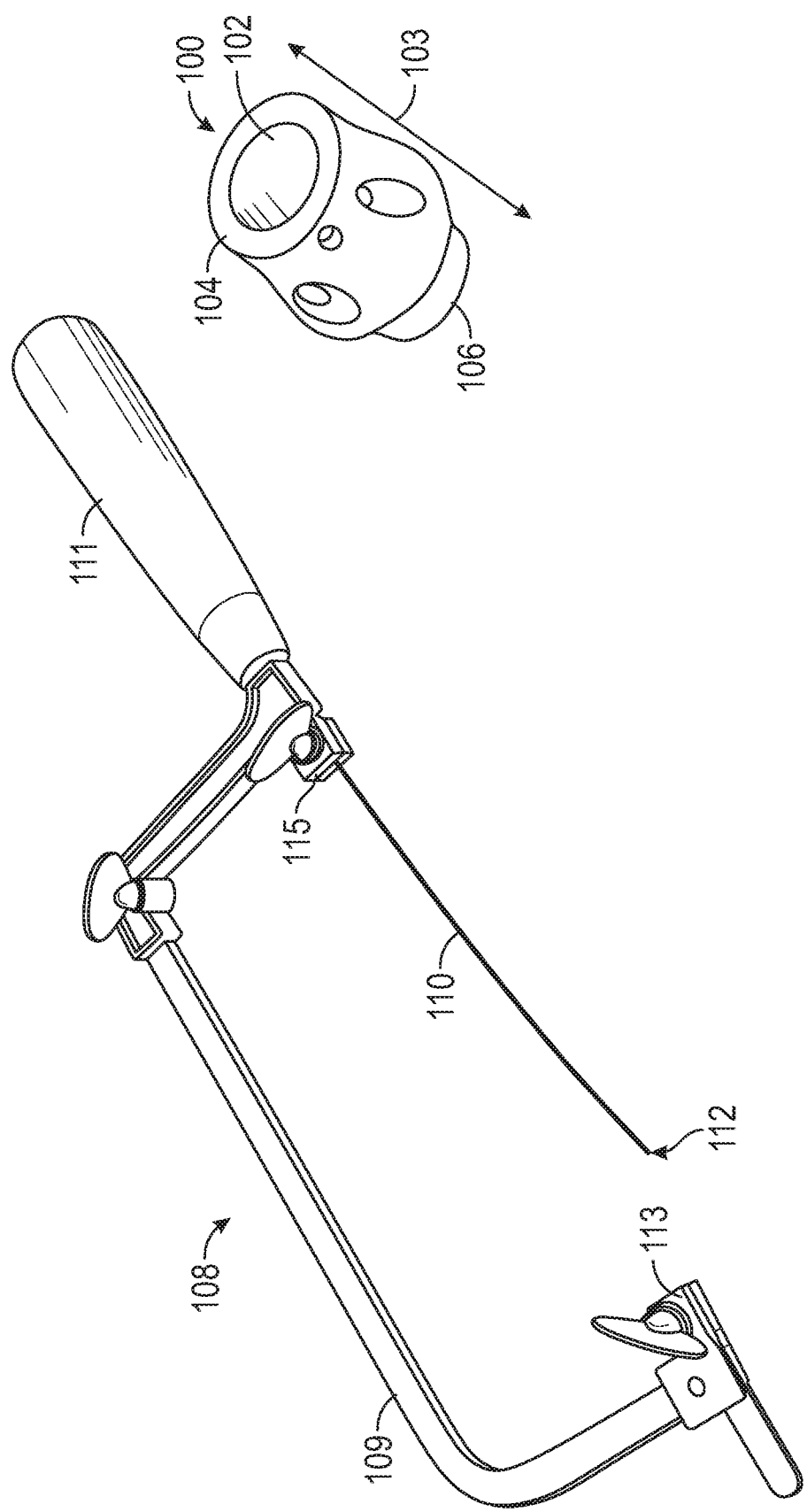
FIG. 1 is a perspective view of a hand held wire saw and a percussion side wall core bullet in accordance with embodiments of the disclosure.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

This disclosure will be described in connection with its embodiments, namely as implemented into a method of preparing a rock sample, also referred to as a core sample or core, for use in digital numerical simulation analysis of the properties of the rock from which that sample was acquired, as it is contemplated that this disclosure may be especially beneficial in such an application. However, it is contemplated that this disclosure may be useful and beneficial in other applications beyond those described in this disclosure. Accordingly, it is to be understood that the following description is provided by way of example only, and is not intended to limit the true scope of this disclosure as claimed.

Embodiments of this disclosure pertain to the acquiring of samples of formation material, also referred to as cores or core samples, and their analysis by way of direct numerical simulation. As such, it is contemplated that embodiments of this disclosure may be beneficial in the acquiring of samples from sub-surface formations important in the exploration and production of hydrocarbons. More specifically, the rock(s) from which these samples may be acquired are contemplated to correspond to formations accessed by terrestrial or marine drilling systems such as used to extract hydrocarbons, water, and the like from those formations. The optimization of oil and gas production operations is largely influenced by the structure and physical properties of these sub-surface rock formations. The samples obtained according to embodiments of this disclosure may be useful in understanding those formation attributes.

Embodiments of the disclosure relate to methods for extracting core material from a percussion sidewall core (PSWC) bullet for a digital tomographic description and direct numerical simulations. PSWCs are obtained by discharging a hollow projectile or bullet into the sidewall of a subterranean borehole. Formation material captured in the bullet barrel is retained and subsequently recovered at the surface. Subsequently, the material or core is typically retrieved from the bullet by a push and/or press technique without any cutting of the core. This technique of core extraction, although quick, does not ensure (1) structural integrity of the core (due to deformation of the core); or (2) chemical integrity of the core (due to mixing of the core with drilling mud). Therefore, the information derived from subsequent analysis of the core is typically limited to being qualitative in nature, such as, for example, grain statistics (i.e., Laser Particle Size Analysis, "LPSA") and chemistry (X-Ray Diffraction,"XRD"), both of which are prone being biased by mud contamination.

Embodiments of the disclosure relate to methods for extracting a core from a bullet. The disclosed methods allow for a core extraction that reduces the risk of damaging the core when compared to other extraction techniques (e.g., push and/or press techniques). Once extracted, core examination/analysis may be performed by using optical and x-ray techniques (e.g., computed microtomography "µCT"). Also, tomographic image analysis may be performed on the core (e.g., in case of a disturbed structure) to provide a grain statistics description. The tomographic images (e.g., digital images) may be utilized with direct numerical simulations ("DNS") to obtain petrophysical and hydrodynamic properties of the core.

DNS of material properties from digital images of rock is a technology for determining the material and petrophysical properties of rock samples/cores. According to DNS, an x-ray tomographic image of a core is taken to produce digital images representative of that sample. A computational experiment is then applied to the digital images to simulate the physical/petrophysical mechanisms from which the physical/petrophysical properties of the core can be measured. Properties of the core, such as, for example, porosity, absolute permeability, relative permeability, formation factor, elastic moduli, and the like, can be determined using direct numerical simulation. In particular, DNS is capable of estimating the material properties of rock types, such as tight gas sands or carbonates, within a timeframe that is substantially shorter than that required for the corresponding physical measurement. In addition, test equipment is not occupied over long periods of time according to this technique, as the analogous numerical conditions to the physical experiment can be immediately applied by computer simulation software.

Embodiments of the disclosure include a multistep process for extracting a core from a bullet. An example of this multistep process is as follows: (1) PSWC bullet is cleaned of excessive mud to minimize core material contamination at the extraction point; (2) a submillimeter cutting wire is introduced in between the bullet inner wall surface and the core material by either a) cutting an entry slit in the bullet along the longitudinal axis using a diamond cut-off/wire saw, b) inserting a free end of a cutting wire directly into the bullet or c) using a pre-drilled submillimeter hole, with subsequent fixation of the wire onto the wire-saw or a manual saw; (3) cutting the core continuously or in steps with low force along the inner surface of the bullet so that the force vector is always nearly tangential, pointing into the wall to minimize cutting into the core and to maximize the extracted volume; (4) upon conclusion of the annular cut (e.g., bullet has rotated 360°), the core is carefully transferred onto a clean surface and manually separated from any remaining mud (e.g., due to mud contamination); (5) the extracted core is examined visually and by using x-ray tomography and either subsampled or used as a whole for μCT scan; and (6) a resulted tomogram is segmented and used for DNS.

Referring now to FIG. 1, an embodiment of a percussion sidewall core (PSWC) bullet 100 is shown. In this embodiment, bullet 100 is generally cylindrical with a central or longitudinal axis 103, a first open end 104, and a second open end 106. A bore or passage 102 extends axially from first end 104 to second end 106. Passage 102 defines a chamber or cavity within which a core of formation material (e.g., core 114 shown in FIG. 3) is captured.

FIG. 1 also illustrates a wire saw 108 including a U-shaped body 109, a handle 111 fixably attached to body 109, and an elongate wire 110 (e.g., sub-millimeter wire) configured to extend across the opening in body 109. Wire 110 has a free end 112 and a fixed end 115 opposite free end 112. Fixed end 115 is fixably secured to body 109 and free end 112 is releasably secured to body 109 with a locking mechanism 113 (in FIG. 1, free end is not secured to body 109). It should be noted that a manual/hand wire saw (as shown on FIG. 1) or an automated wire saw (not hand held) may be utilized for cutting.

Figure 2:
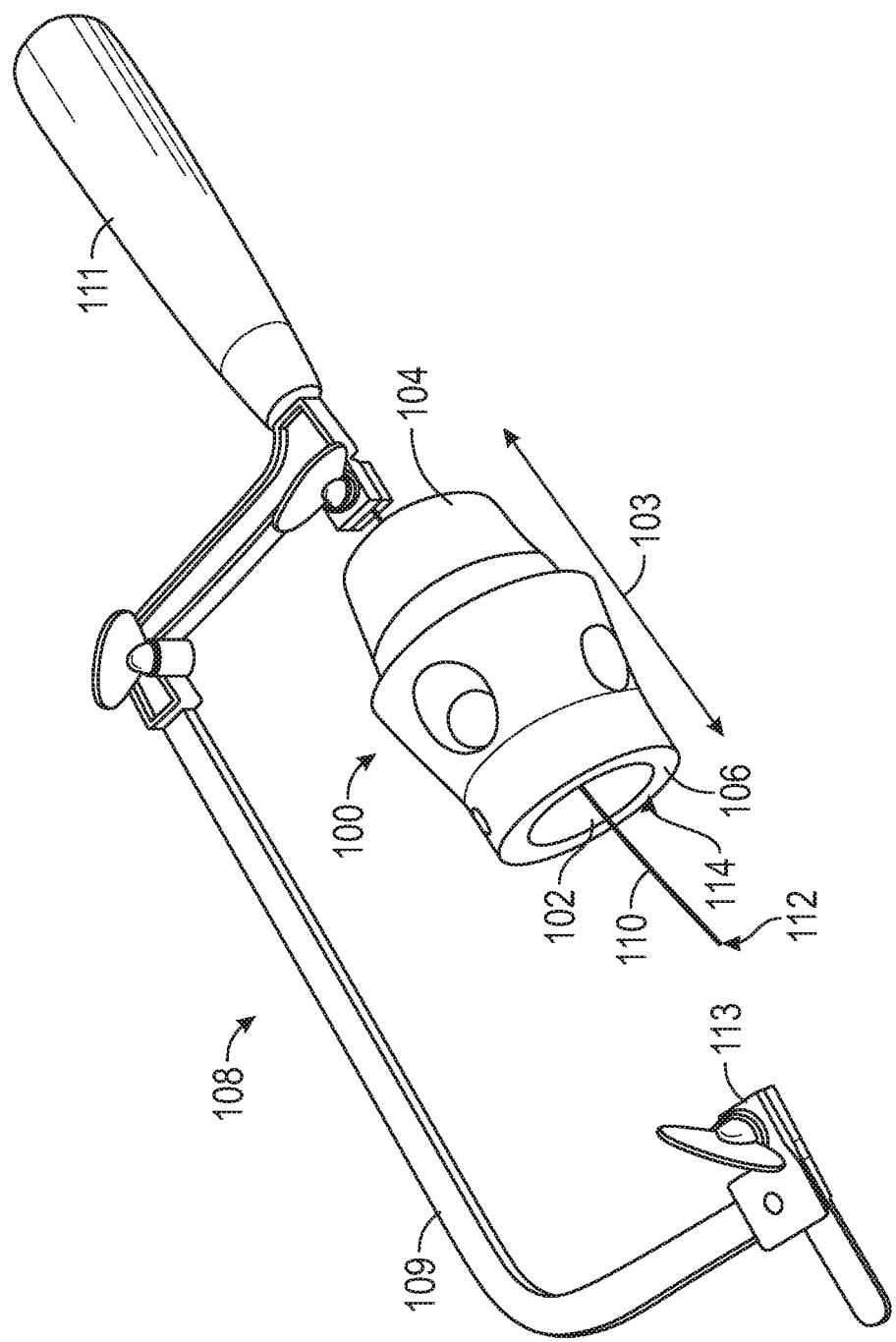
FIG. 2 is a perspective view of the hand held wire saw of FIG. 1 being positioned to cut a core from the percussion side wall core bullet of FIG. 1 in accordance with embodiments of the disclosure.
Figure 3:
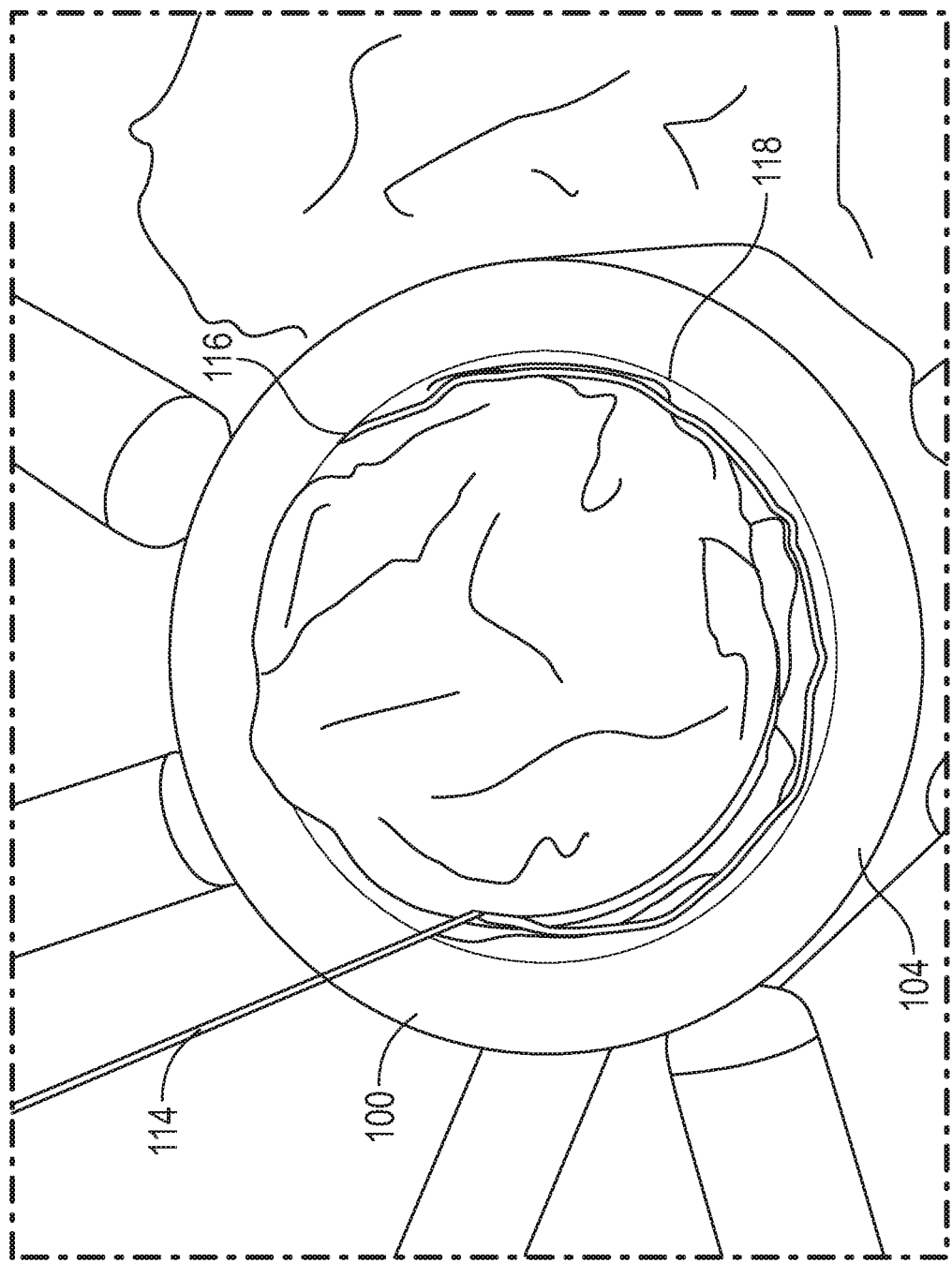
FIG. 3 is an end view of the percussion side wall core bullet of FIG. 1 and the core contained therein.
Figure 4:
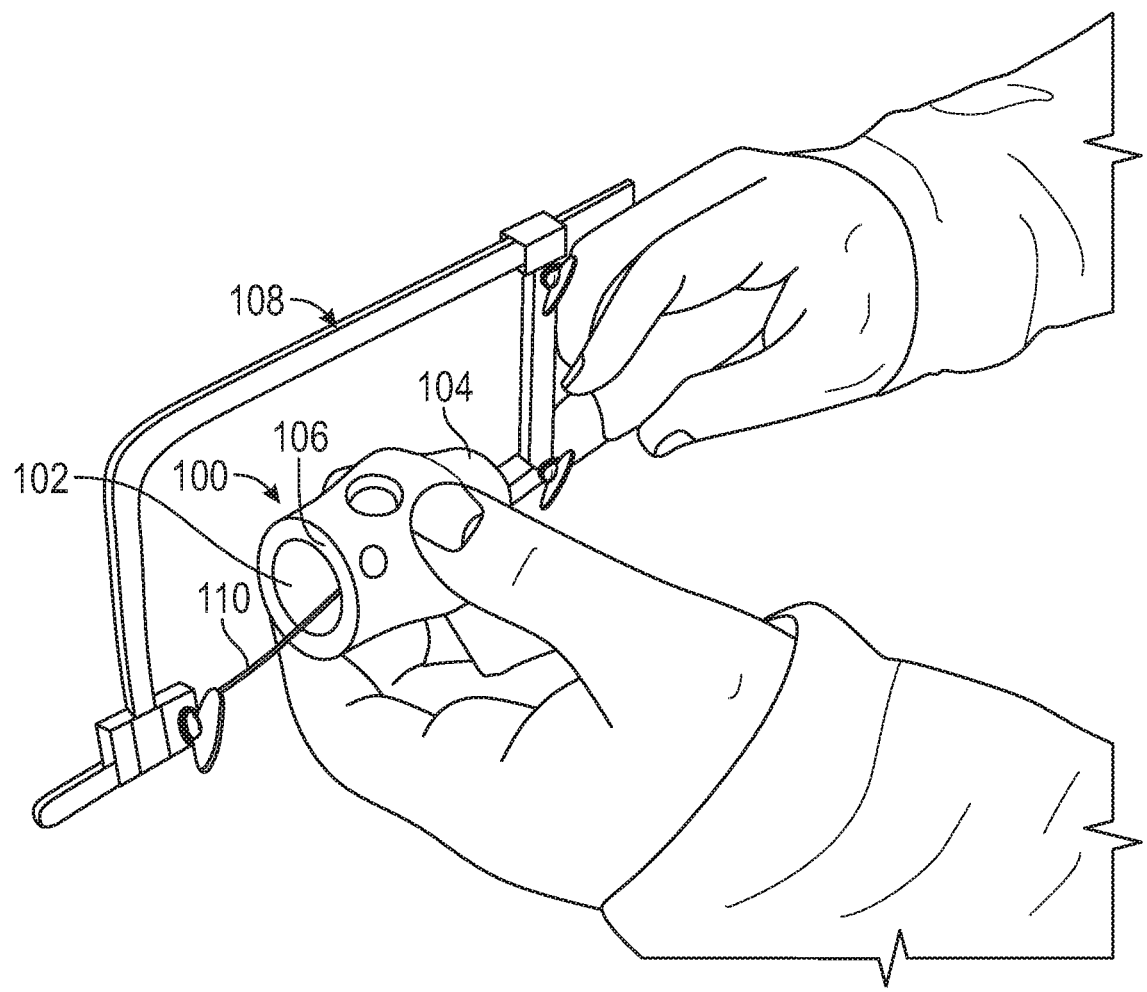
FIG. 4 is a perspective view of the core being cut from the percussion side wall core bullet of FIG. 1 in accordance with embodiments of the disclosure.

Referring now to FIG. 2, wire 110 is shown being positioned through passage 102 by inserting and advancing free end 112 axially (relative to axis 103) through open ends 104, 106 and a core 114 disposed in passage 102. In this embodiment, free end 112 of wire 110 is pushed axially completely through core 114 (from first end 104 to second end 106) along a trajectory that is radially adjacent to inner surface 118 (e.g., point 116 that is positioned within core 114 and positioned to contact inner surface 118 of bullet 100 as shown in FIG. 3). It should be noted that free end 112 of wire 110 may only be pushed (due to stiffness of wire 110) through core 114 if core 114 is sufficiently soft to allow for wire 110 to be pushed therethrough or if there is a sufficient layer of drilling mud surrounding core 114. Alternatively, if core 114 is not sufficiently soft (i.e., too hard to allow for pushing wire 110 therethrough), then a hole (e.g., submillimeter hole) may first be drilled through core 114 adjacent inner surface 118 at point 116 shown in FIG. 3. It should be noted that point 116 represents an entry point for free end 112, and may also depict a hole formed by drilling or a hole caused by a push through of wire 110 through core 114. It should be appreciated that the process of pushing the wire through core 114 or drilling a hole through core 114 generally does not disturb or damage the core 114. After wire 110 has passed through core 114, free end 112 of wire 110 is attached to locking mechanism 113, as shown in FIG. 4, and then the wire saw 108 used to cut the core 114 from the bullet 100.

Figure 5:
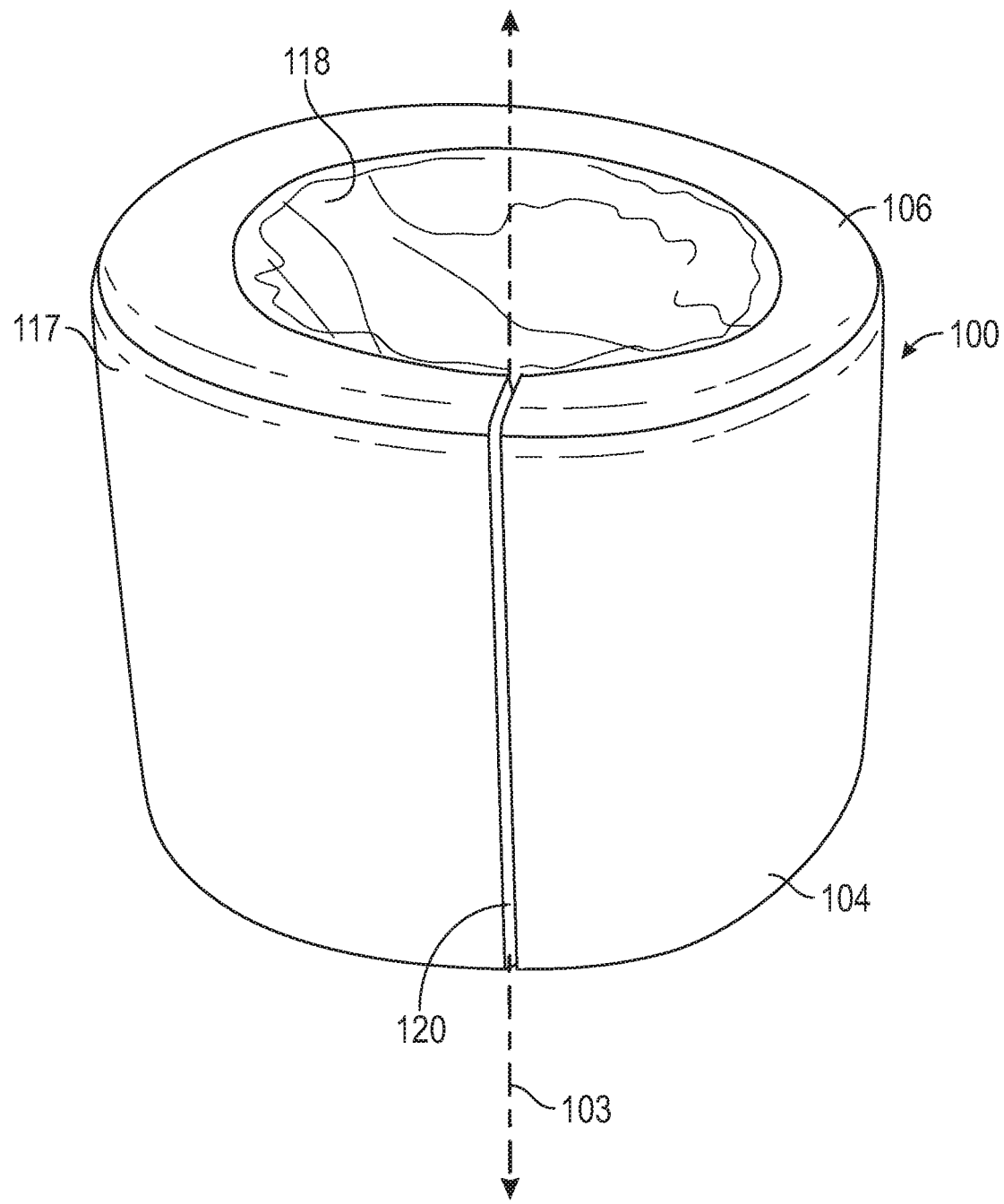
FIG. 5 is a perspective view of a percussion side wall core bullet with an entry slit in accordance with embodiments of the disclosure.

As shown in FIGS. 2 and 3 and the corresponding description above, wire 110 is positioned though core 114 by pushing free end 112 through open ends 104, 106 and core disposed in passage 102. However, as shown in FIG. 5, in other embodiments, wire 110 can be positioned through core 114 via an entry slit 120 cut (with a saw such as wire saw 108) radially through bullet 100 (instead of pushing wire 110 through core 114 or drilling a hole into core 114). In this embodiment, entry slit 120 is oriented parallel to axis 103 and extends radially from outer surface 117 to inner surface 118. Entry slit 120 allows wire 110 (with free end 112 attached to locking mechanism 113) to pass radially through bullet 100 and into core 114 disposed within passage 102 to allow subsequent recovery of core 114.

Figure 8:
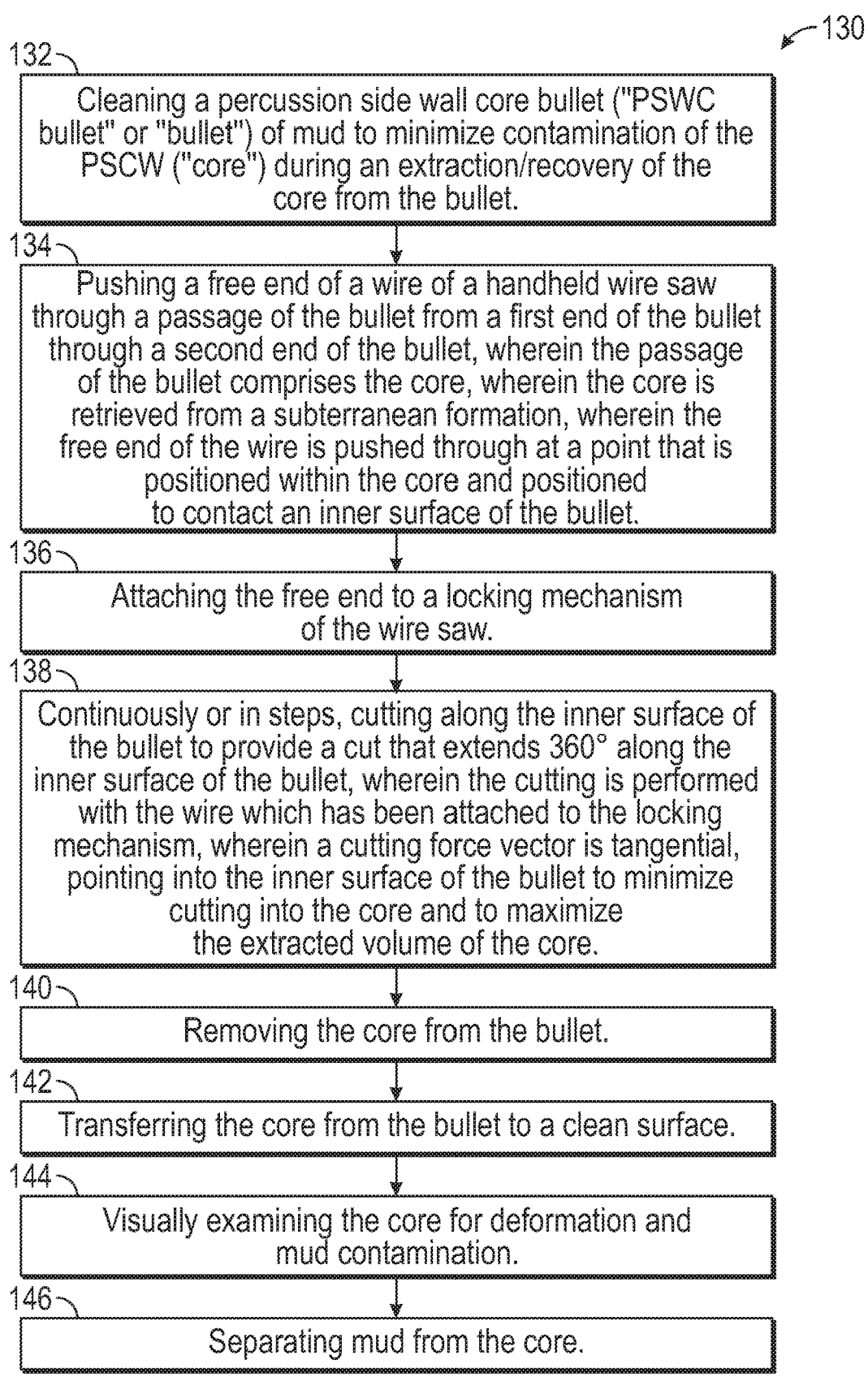
FIG. 8 is an exemplary flow chart illustrating an embodiment of a method for obtaining a core from a percussion side wall core bullet in accordance with embodiments of the disclosure.

Referring now to FIG. 8, an embodiment of a method 130 for removing a core (e.g., core 114) from a bullet (e.g., bullet 100) is shown. For purposes of clarity and further explanation, method 130 will be described with reference to recovery of core 114 from bullet 100 previously described. However, in general, method 130 can be used in connection with other cores and bullets.

Starting in block 132, method 130 begins by cleaning percussion side wall core bullet 100 to remove mud 124 therefrom to minimize contamination of the core 114 during an extraction/recovery of core 114 from bullet 100. Next, method 130 continues in block 134 by pushing free end 112 of wire 110 (of wire saw 108) through passage 102 and core 114 disposed therein by advancing free end 112 through ends 104, 106 of bullet 100 as shown in FIG. 2. In this embodiment, free end 112 is initially pushed through core 114 at point 116 positioned radially adjacent inner surface 118 of bullet 100 such that wire saw 108 contacts inner surface 118. Moving now to block 136, with wire saw 108 extending through core 114 and ends 104, 106 of bullet 100, free end 112 is securely attached to wire saw 108 with locking mechanism 113. Method 130 continues at block 138 by cutting along inner surface 118 of bullet 100 as shown in FIG. 4 to provide a cut that extends 360° along inner surface 118 of bullet 100 as shown in FIG. 3. With wire saw 108 secured with locking mechanism 113, cutting is performed along a path that is substantially tangential or tangential to inner surface 118 to minimize cutting into core 114 and bullet 100, and thereby maximizing the extracted volume of core 114. Upon completion of the 360° cut, core 114 is removed from bullet 100 in block 140 by pushing and/or pulling core 114 from bullet 100 (i.e., with hands or various tools, such as for example, a rod). Due to the cut extending circumferentially along the entire outer perimeter of core 114, core 114 generally slides out of passage 102 through either end 104, 106. Next, in blocks 142, 144, 146, the removed core 114 is transferred to a clean surface 122, cleaned of any remaining mud 124, visually inspected for deformation and mud contamination, and based on the inspection, cleaned of any remaining mud 124. Once recovered and cleaned, core 114 may be examined, via x-ray tomography (e.g., μCT scan (computed microtomography scan)), to provide digital images of the core to a computer system. The computer system may provide a grain statistics description of the core based on the digital images. The digital images may be segmented with the computer system and provided to the computer system for DNS to obtain petrophysical and hydrodynamic properties of core 114.

Figure 9:
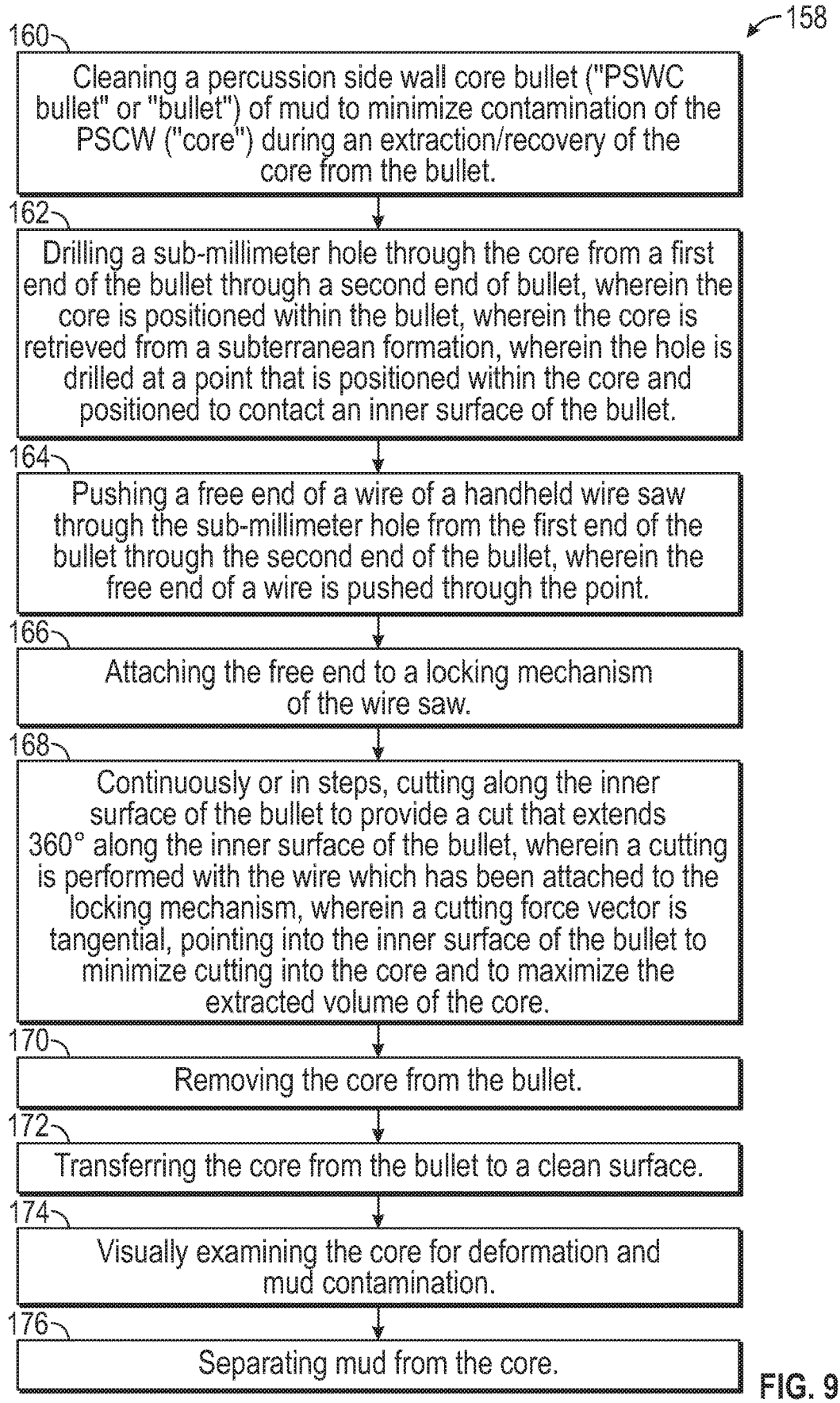
FIG. 9 is an exemplary flow chart illustrating an embodiment of a method for obtaining a core from a percussion side wall core bullet in accordance with embodiments of the disclosure.

Referring now to FIG. 9, another embodiment of a method 158 for removing a core (e.g., core 114) from a bullet (e.g., bullet 100) is shown. For purposes of clarity and further explanation, method 158 will be described with reference to recovery of core 114 from bullet 100 previously described. However, in general, method 158 can be used in connection with other cores and bullets. Method 158 is similar to method 130 previously described with the exception that free end 112 is pushed through a pre-drilled hole in core 114.

Starting in block 160, method 158 starts with cleaning percussion side wall core bullet 100 to remove mud 124 therefrom to minimize contamination of the core 114 during an extraction/recovery of core 114 from bullet 100. Next, method 158 continues in block 162, which includes drilling a sub-millimeter hole through core 114 from one end 104 to the other end 106. The hole is started at point 116 positioned radially adjacent inner surface 118 of bullet 100 and drilled parallel to axis 103 along the inner surface 118 of bullet 100. Next, in block 164, free end 112 is inserted into the pre-drilled hole in core 114 and advanced therethrough from one end 104 to the other end 106. Moving now to block 166, with wire saw 108 extending through core 114 and ends 104, 106, free end 112 is securely attached to wire saw 108 with locking mechanism 113. Method 158 continues at block 168 by cutting along inner surface 118 of bullet 100 as shown in FIG. 4 to provide a cut that extends 360° along inner surface 118 as shown in FIG. 3. With wire saw 108 secured with locking mechanism 113, cutting is performed along a path that is substantially tangential or tangential to inner surface 118 to minimize cutting into core 114 and bullet 100, and thereby maximizing the extracted volume of core 114. Upon completion of the 360° cut, core 114 is removed from bullet 100 in block 170 by pushing and/or pulling core 114 from bullet 100 (i.e., with hands or various tools, such as for example, a rod). Due to the cut extending circumferentially along the entire outer perimeter of core 114, core 114 generally slides out of passage 102 through either end 104, 106. Next, in blocks 172, 174, 176, the removed core 114 is transferred to a clean surface 122, cleaned of any remaining mud 124, visually inspected for deformation and mud contamination, and based on the inspection, cleaned of any remaining mud 124. Once recovered and cleaned, core 114 may be examined, via x-ray tomography (e.g., µCT scan (computed microtomography scan)), to provide digital images of the core to a computer system. The computer system may provide a grain statistics description of the core based on the digital images. The digital images may be segmented with the computer system and provided to the computer system for DNS to obtain petrophysical and hydrodynamic properties of core 114.

Figure 6:
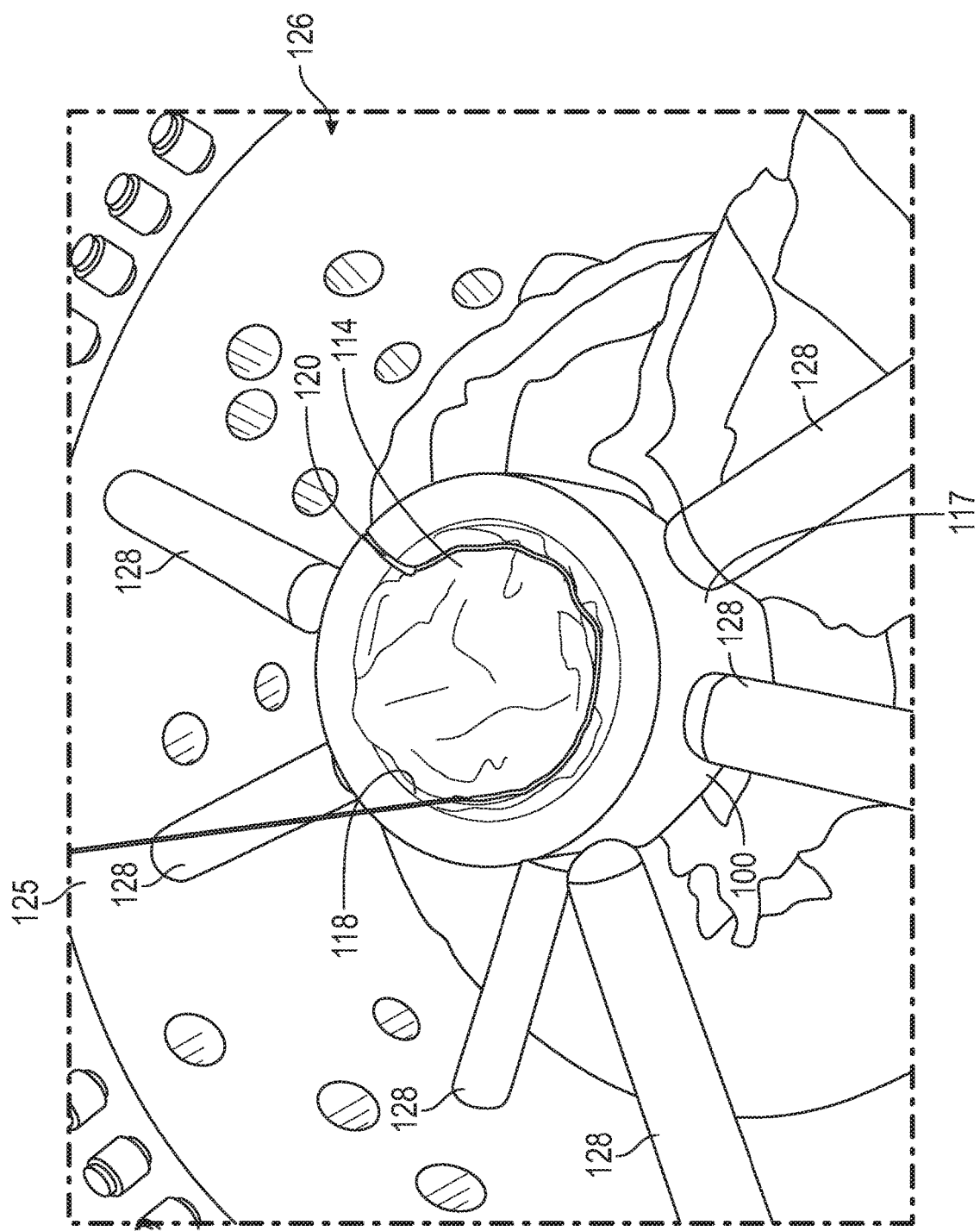
FIG. 6 is a perspective view of a percussion side wall core bullet with a core contained therein being positioned in an automated wire saw assembly in accordance with embodiments of the disclosure.
Figure 7:
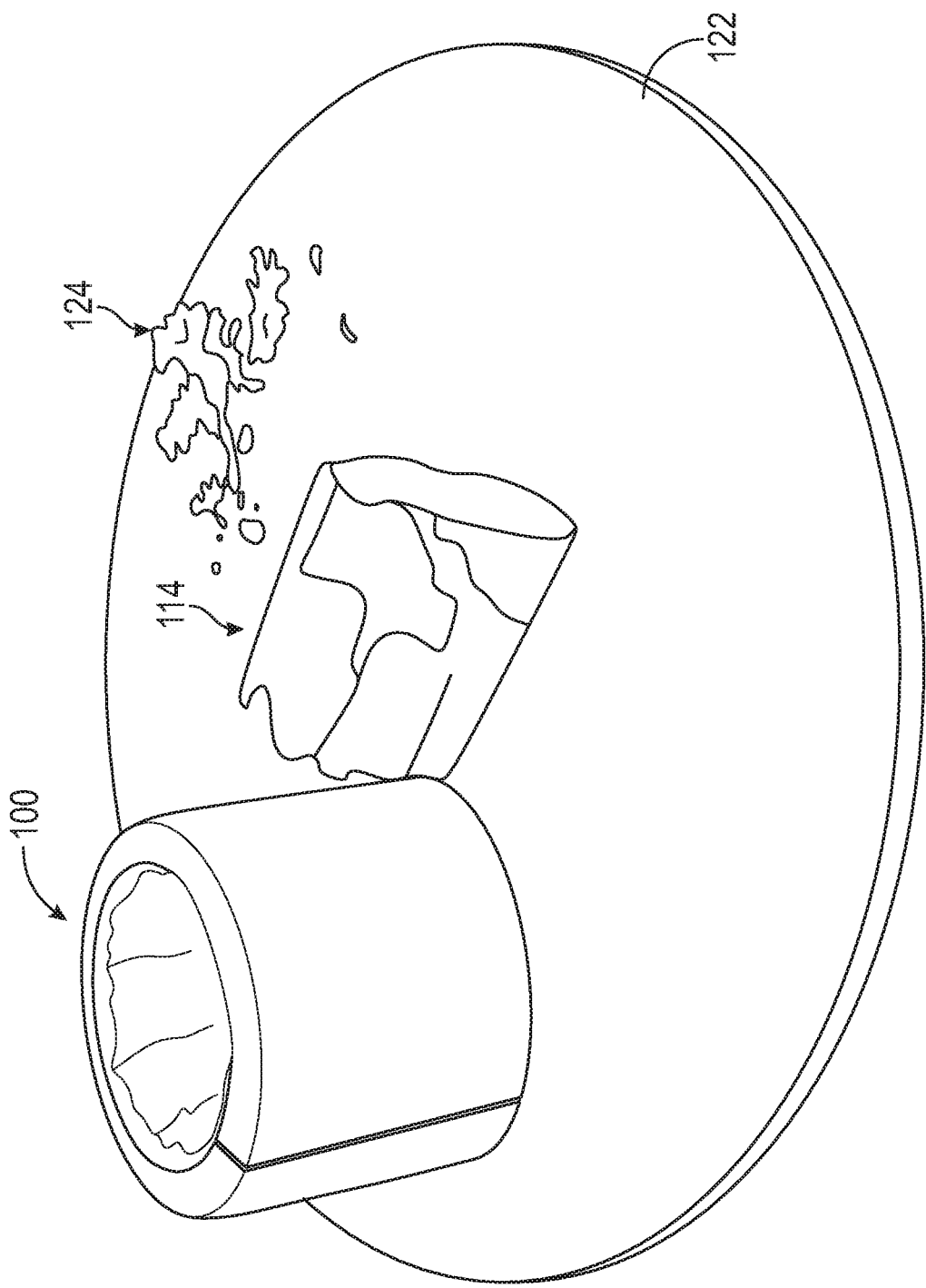
FIG. 7 is a perspective view of a percussion side wall core bullet and a core removed from the bullet in accordance with embodiments of the disclosure.

Referring now to FIG. 10, another embodiment of a method 188 for removing a core (e.g., core 114) from a bullet (e.g., bullet 100) is shown. For purposes of clarity and further explanation, method 188 will be described with reference to recovery of core 114 from bullet 100 previously described. However, in general, method 188 can be used in connection with other cores and bullets. Method 188 is similar to method 130 previously described with the exception that free end 112 is not pushed axially through core 114 but rather, access to core 114 is provided by cutting radially through bullet 100 as shown in FIGS. 5 and 6 for example.

Starting in block 190, method 188 starts with cleaning percussion side wall core bullet 100 to remove mud 124 therefrom to minimize contamination of the core 114 during an extraction/recovery of core 114 from bullet 100. Next, method 188 continues in block 192, bullet 100 including core 114 disposed therein is positioned (for cutting) with alignment bars 128 of automated wire saw assembly 126 as shown in FIG. 6. Wire saw assembly 126 includes a wire saw 125 that is similar to wire saw 108 previously described. Next, wire saw 125 cuts entry slit 120 through bullet 100 according to block 194. Entry slit is oriented parallel to axis 103, extends axially from first end 104 to second end 106, and extends radially from outer surface 117 to inner surface 118. Moving now to block 196, wire saw 125 cuts along inner surface 118 of bullet 100 to provide a cut that extends 360° along inner surface 118 as shown in FIG. 3. Cutting is performed along a path that is substantially tangential or tangential to inner surface 118 to minimize cutting into core 114 and bullet 100, and thereby maximizing the extracted volume of core 114. Upon completion of the 360° cut, core 114 is removed from bullet 100 in block 198 by pushing and/or pulling core 114 from bullet 100 (i.e., with hands or various tools, such as for example, a rod). Due to the cut extending circumferentially along the entire outer perimeter of core 114, core 114 generally slides out of passage 102 through either end 104, 106. Next, in blocks 200, 202, 204, the removed core 114 is transferred to a clean surface 122, 124 cleaned of any remaining mud 124, visually inspected for deformation and mud contamination, and based on the inspection, cleaned of any remaining mud 124. Once recovered and cleaned, core 114 may be examined, via x-ray tomography (e.g., µCT scan (computed microtomography scan)), to provide digital images of the core to a computer system. The computer system may provide a grain statistics description of the core based on the digital images. The digital images may be segmented with the computer system and provided to the computer system for DNS to obtain petrophysical and hydrodynamic properties of core 114.

Certain aspects of the disclosure may be implemented by a computer system. For purposes of this disclosure, a computer system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a computer system may be a personal computer or tablet device, a cellular telephone, a network storage device, or any other suitable device and may vary in size, shape, performance, functionality, and price. The computer system may include random access memory ("RAM"), one or more processing resources such as a central processing unit ("CPU") or hardware or software control logic, read-only memory ("ROM"), and/or other types of nonvolatile memory. Additional components of the computer system may include one or more disk drives, one or more network ports for communication with external devices as well as various input and output (I/O) devices, such as a keyboard, a mouse, and a video display. The computer system also may include one or more buses operable to transmit communications between the various hardware components.

The computer system may also include computer-readable media. Computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such wires, optical fibers, microwaves, radio waves, and other electromagnetic and/or optical carriers; and/or any combination of the foregoing.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for extracting a core from a percussion side wall core bullet for a digital tomographic description and direct numerical simulations, the method comprising:
    (a) pushing a free end of a wire of a wire saw through the core disposed within the percussion side wall core bullet;
    (b) attaching the free end of the wire to a locking mechanism of the wire saw after (a);
    (c) cutting the core from the percussion side wall core bullet with the wire after (b).

2. The method of claim 1, wherein (c) comprises:
    (c1) cutting tangential to a cylindrical inner surface of the percussion side wall core bullet;
    (c2) cutting 360° around the core during (c1);
    (c3) cutting along the inner surface of the percussion side wall core bullet during (c1) and (c2) to minimize cutting into the core and to maximize the extracted volume of the core.

3. The method of claim 2, further comprising visually examining the core for deformation and mud contamination.

4. The method of claim 3, further comprising:
    removing mud from the percussion side wall core bullet before (a); and
    removing mud from the core to reduce mud contamination.

5. The method of claim 4, further comprising examining the core via x-ray tomography to provide digital images of the core to a computer system.

6. The method of claim 5, further comprising segmenting the digital images with the computer system.

7. The method of claim 6, further comprising obtaining, with the computer system, petrophysical and hydrodynamic properties of the core via direct numerical simulations and segmented digital images of the core.

8. A method for extracting a core from a percussion side wall core bullet for a digital tomographic description and direct numerical simulations, the method comprising:
    (a) drilling a hole through the core disposed within the percussion side wall core bullet;
    (b) pushing a free end of a wire of a wire saw through the hole in the core after (a);
    (c) cutting the core from the percussion side wall core bullet with the wire saw after (b); and
    (d) removing the core from the percussion side wall core bullet after (c).

9. The method of claim 8, wherein (a) comprises drilling a sub-millimeter hole through the core in a direction parallel to a longitudinal axis of the core.

10. The method of claim 9, wherein (c) comprises cutting along an inner surface of the percussion side wall core bullet to provide a cut that extends 360° along the inner surface of the percussion side wall core bullet.

11. The method of claim 10, further comprising examining the core via x-ray tomography to provide digital images of the core to a computer system.

12. The method of claim 11, wherein the examining the core comprises examining the core via x-ray microtomography.

13. The method of claim 12, further comprising obtaining, with the computer system, petrophysical and hydrodynamic properties of the core via direct numerical simulations and segmented digital images of the core.

14. The method of claim 11, further comprising segmenting the digital images with the computer system.

15. The method of claim 14, further comprising providing, with the computer system, a grain statistics description of the core based on the digital images.

16. A method for extracting a core from a percussion side wall core bullet for a digital tomographic description and direct numerical simulations, the method comprising:
    (a) positioning the percussion side wall core bullet with the core disposed therein, into an automated wire saw assembly;
    (b) cutting an entry slit in the percussion side wall core bullet with a wire of the automated wire saw assembly after (a); and
    (c) cutting the core from the percussion side wall core bullet with the wire of the automated wire saw assembly after (b).

17. The method of claim 16, wherein (b) comprises cutting from an outer surface of the percussion side wall core bullet to an inner surface of the percussion side wall core bullet.

18. The method of claim 17, wherein (b) further comprises cutting in a direction perpendicular to a longitudinal axis of the percussion side wall core bullet.

19. The method of claim 18, wherein (c) further comprises cutting along an inner surface of the percussion side wall core bullet after (b) to provide a cut that extends 360° along the inner surface of the percussion side wall core bullet.

20. The method of claim 19, further comprising examining the core via x-ray tomography to provide digital images of the core to a computer system.

* * * * *